United States Patent
Rezaiifar et al.

(10) Patent No.: US 8,089,940 B2
(45) Date of Patent: Jan. 3, 2012

(54) METHOD AND SYSTEM FOR EFFICIENT AND RELIABLE DATA PACKET TRANSMISSION

(75) Inventors: Ramin Rezaiifar, San Diego, CA (US); Yongbin Wei, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1287 days.

(21) Appl. No.: 09/972,530

(22) Filed: Oct. 5, 2001

(65) Prior Publication Data

US 2003/0067907 A1 Apr. 10, 2003

(51) Int. Cl.
*H04B 7/216* (2006.01)
(52) U.S. Cl. ............ 370/335; 370/342; 714/748
(58) Field of Classification Search ........... 370/229, 370/230, 235, 252, 335, 310, 320, 341, 342; 714/746–748
See application file for complete search history.

(56) References Cited

U.S. PATENT DOCUMENTS

| | | | |
|---|---|---|---|
| 4,712,214 A * | 12/1987 | Meltzer et al. ............ | 714/748 |
| 5,548,593 A | 8/1996 | Peschi | |
| 5,617,541 A | 4/1997 | Albanese et al. | |
| 5,648,970 A | 7/1997 | Kapoor | |
| 5,930,233 A * | 7/1999 | Kanerva et al. ............ | 370/231 |
| 5,968,197 A | 10/1999 | Doiron | |
| 6,011,796 A | 1/2000 | Rezaiifar et al. | |
| 6,126,310 A | 10/2000 | Osthoff et al. | |
| 6,170,075 B1 * | 1/2001 | Schuster et al. ............ | 714/776 |
| 6,247,059 B1 * | 6/2001 | Johnson et al. ............ | 709/237 |
| 6,370,153 B1 | 4/2002 | Eng | |
| 6,434,147 B1 | 8/2002 | Brown et al. | |
| 6,594,791 B2 * | 7/2003 | Sipola ............ | 714/748 |
| 6,606,306 B1 | 8/2003 | Lin et al. | |
| 6,618,375 B2 | 9/2003 | Rezaiifar et al. | |
| 6,804,220 B2 * | 10/2004 | Odenwalder et al. ......... | 370/337 |
| 6,832,261 B1 | 12/2004 | Westbrook et al. | |

(Continued)

FOREIGN PATENT DOCUMENTS

CN 1214828 A 4/1999

(Continued)

OTHER PUBLICATIONS

Lucent technologies, asynchronous and Adaptive Incremental Redundancy (AA IR) proposal for HSDPA, Nov. 25, 2000, TSG-RAN working group 1, pp. 1-5.*

(Continued)

*Primary Examiner* — Steven H Nguyen
(74) *Attorney, Agent, or Firm* — Charles E. Eggers

(57) ABSTRACT

A method and system provides for efficient data throughput by avoiding unnecessary data sub-packets transmission while not missing new data packets. The method and system distinguishes between a sub-packet for a current data packet and a sub-packet for a new data packet by assigning different codes to them. When a currently received sub-packet and a previously received sub-packet for a previously decoded data packet have equivalent codes, the remote station sends an acknowledgement signal to the base station, preventing unnecessary sub-packets transmission. When the currently received sub-packet and the previously received sub-packet have different codes, the remote station sends an acknowledgement signal, if the remote station can decode the new packet from the current sub-packet. Otherwise, the remote station sends a negative acknowledgement signal to the base station, and requests more sub-packs for the current packet if the limit on number of transmission for currently received sub-packet has not reached.

26 Claims, 5 Drawing Sheets

U.S. PATENT DOCUMENTS

| | | | |
|---|---|---|---|
| 6,876,657 B1 | 4/2005 | Brewer et al. | |
| 6,895,011 B1 | 5/2005 | Lassers | |
| 6,928,473 B1 | 8/2005 | Sundaram et al. | |
| 6,937,585 B2 | 8/2005 | Proctor et al. | |
| 6,963,582 B1 | 11/2005 | Xu | |
| 7,009,976 B1 | 3/2006 | Michelson et al. | |
| 7,065,068 B2* | 6/2006 | Ghosh et al. | 370/342 |
| 7,065,213 B2 | 6/2006 | Pinder | |
| 7,079,505 B2 | 7/2006 | Okunishi et al. | |
| 7,092,393 B1 | 8/2006 | Westbrook et al. | |
| 7,113,523 B1 | 9/2006 | Kubota et al. | |
| 7,215,679 B2 | 5/2007 | Pugel | |
| 2001/0056560 A1* | 12/2001 | Khan et al. | 714/746 |
| 2002/0064167 A1* | 5/2002 | Khan et al. | 370/410 |
| 2002/0146013 A1* | 10/2002 | Karlsson et al. | 370/395.6 |
| 2003/0043758 A1* | 3/2003 | Jou | 370/278 |
| 2003/0054807 A1 | 3/2003 | Hsu et al. | |
| 2003/0066004 A1* | 4/2003 | Rudrapatna et al. | 714/751 |
| 2003/0076810 A1* | 4/2003 | Rezaiifar et al. | 370/394 |
| 2004/0248573 A1* | 12/2004 | Wandel | 455/435.1 |
| 2006/0209783 A1 | 9/2006 | Jain et al. | |
| 2008/0187136 A1 | 8/2008 | Zhang et al. | |

FOREIGN PATENT DOCUMENTS

| | | | |
|---|---|---|---|
| EP | 0633678 | | 11/1995 |
| EP | 1137226 | | 9/2001 |
| EP | 1195938 A1 | * | 4/2002 |
| JP | 07-123079 | | 5/1995 |
| JP | 1146187 | | 2/1999 |
| KR | 1020000048677 | | 7/2000 |
| WO | 9813940 | | 4/1998 |
| WO | WO 0147124 | * | 6/2006 |

OTHER PUBLICATIONS

Lucent Technologies "TSG-RAN#17(00)1382: Asynchronous and Adaptive Incremental Redundancy for HSDPA," SG-RAN#17(00)1382, 2000.

Gong, F. et al. "An Application-Oriented Error Control Scheme for High-Speed Networks," IEEE/ ACM Trans. on Networking, 4(5): 669-682, 1996.

Braneci, M. et al. "Ambiguity Analysis for a Hybrid Type II ARQ/ FEC Protocol on a Fluctuating Radio Channel," IEEE: 1068-1072, 1997.

Benelli, G. et al. "A Coding and Retransmission Protocol for Mobile Radio Data Transmission," IEEE: 2505-2509, 1999.

Lucent Technologies, "TSG-RAN#17(00)1382: Asynchronous and Adaptive Incremental Redundancy for HSDPA," TSG-RAN#17(00)1382, 2000, pp. 1-5.

F. Gong et al., "An Application-Oriented Error Control Scheme for High-Speed Networks," IEEE/ ACM Trans. on Networking, New York, vol. 4, No. 5, 1996, pp. 669-682.

M. Braneci et al., "Ambiguity Analysis for a Hybrid Type II ARQ/ FEC Protocol on a Fluctuating Radio Channel," IEEE International Conference on Montreal, France, 1997, pp. 1068-1072.

G.Benelli et al., "A Coding and Retransmission Protocol for Mobile Radio Data Transmission," IEEE Vehicular Technology Conference, Netherlands, 1999. pp. 2505-2509.

P. Yu et al., "An Efficient Selective-Repeat ARQ Scheme for Satellite Channels and Its Throughpout Analysis," IEEE Transactions on Communications, New York, vol. COM-29, No. 3, 1981, 353-363.

International Search Report PCT/US02/31778 mailed Jun. 13, 2003.

"HARQ Protocol: Details of Asynchronous/Synchronous HARQ Scheme, Discussion and decision, Agenda Item 9.2.2, Source: Motorola", 3GPP TSG-RAN WG2, TSGR2#23-011977, Aug. 27-31, 2001, Helsinki, Finland.

3rd Generation Partnership Project; Technical Specification Group Radio Access Network; High Speed Downlink Packet Access; Overall UTRAN Description (Release 5), Technical Report, 3GPP TR 25.855 v5.0.0 (Sep. 2001), 28 pages, 3GPP Organizational Partners.

Siemens AG "In-sequence delivery of for an Async/Sync HARQ scheme" 3GPP TSG-RAN WG2 Meeting #23 R2-011878, Jul. 31, 2001, Internet Search Date: Jan. 25, 2008.

International Preliminary Examination Report—PCT/US02/ 031778, IPEA/US, Alexandria, VA Apr. 28, 2004.

U.S. Appl. No. 60/322,698, filed on Sep.17, 2001.

* cited by examiner

METHOD AND SYSTEM FOR EFFICIENT AND RELIABLE DATA PACKET TRANSMISSION

REFERENCE TO CO-PENDING APPLICATION FOR PATENT

The present invention is related to the following application for patent in the U.S. Patent & Trademark Office: "METHOD AND SYSTEM FOR IMPROVING DATA THROUGHPUT" by Ramin Rezaiifar, et al., U.S. patent application Ser. No. 09/967,783, assigned to the assignee hereof, and which is expressly incorporated by reference herein.

BACKGROUND

1. Field

The present invention relates to data communication. More particularly, the present invention relates to improving data throughput of a wireless communication system by preventing unnecessary data sub-packets transmission while not missing new data packets.

2. Background

The field of wireless communications has many applications including, e.g., wireless telephones, paging, wireless local loops, personal digital assistants (PDAs), Internet telephony, and satellite communication systems. A particularly important application is cellular telephone systems for mobile subscribers. (As used herein, the term "cellular" systems encompass both cellular and personal communications services (PCS) frequencies.) Various over-the-air interfaces have been developed for such cellular telephone systems including, e.g., frequency division multiple access (FDMA), time division multiple access (TDMA), and code division multiple access (CDMA). In connection therewith, various domestic and international standards have been established including, e.g., Advanced Mobile Phone Service (AMPS), Global System for Mobile (GSM), and Interim Standard 95 (IS-95). In particular, IS-95 and its derivatives, IS-95A, IS-95B, ANSI J-STD-008 (often referred to collectively herein as IS-95), and high-data-rate (HDR) systems for data, etc. are promulgated by the Telecommunication Industry Association (TIA), the International Telecommunications Union (ITU), and other well known standards bodies.

Cellular telephone systems configured in accordance with the use of the IS-95 standard employ CDMA signal processing techniques to provide highly efficient and robust cellular telephone service. An exemplary described system utilizing CDMA techniques is the cdma2000. The standard for cdma2000 is given in IS-2000 and has been approved by the TIA. The cdma2000 standard is compatible with IS-95 systems in many ways. Another CDMA standard is the W-CDMA standard, as embodied in 3rd Generation Partnership Project "3GPP." Another CDMA standard is Interim Standard IS-856, which is commonly referred to as a HDR system.

Transmission of digital data is inherently prone to interference, which may introduce errors into the transmitted data. Error detection schemes have been suggested to determine as reliably as possible whether errors have been introduced into the transmitted data. For example, it is common to transmit data in packets and add to each packet a cyclic redundancy check (CRC) field, for example of a length of sixteen bits, which carries a checksum of the data of the packet. When a receiver receives the data, the receiver calculates the same checksum on the received data and verifies whether the result of the calculation is identical to the checksum in the CRC field.

When the transmitted data is not used in a delay sensitive application, it is possible to request retransmission of erroneous data when errors are detected. However, when the transmission is used in a delay sensitive application, such as, e.g., in telephone lines, cellular phones, remote video systems, etc., it may not be possible to request retransmission.

Convolutional codes have been introduced to allow receivers of digital data to correctly determine the transmitted data even when errors may have occurred during transmission. The convolutional codes introduce redundancy into the transmitted data and pack the transmitted data into packets in which the value of each bit is dependent on earlier bits in the sequence. Thus, when errors occur, the receiver can still deduce the original data by tracing back possible sequences in the received data.

To further improve the performance of a transmission channel, interleavers are used to re-order bits in the packet during coding. Thus, when interference destroys some adjacent bits during transmission, the effect of the interference is spread out over the entire original packet and can more readily be overcome by the decoding process. Other improvements may include multiple-component codes that encode the packet more than once, in parallel or in series, or a combination thereof. For example, it is known in the art to employ an error correction method that uses at least two convolutional coders in parallel. Such parallel encoding is commonly referred to as turbo coding.

For multiple-component codes, optimal decoding is often a very complex task, and may require large periods of time not usually available for on-line decoding. Iterative decoding techniques have been developed to overcome this problem. Rather than determining immediately whether received bits are zero or one, the receiver assigns each bit a value on a multilevel scale representative of the probability that the bit is one. Data represented on the multilevel scale is referred to as "soft data," and iterative decoding is usually soft-in/soft-out, i.e., the decoding process receives a sequence of inputs corresponding to probabilities for the bit values and provides as output corrected probabilities, taking into account constraints of the code. Generally, a decoder that performs iterative decoding uses soft data from former iterations to decode the soft data read by the receiver. During iterative decoding of multiple-component codes, the decoder uses results from the decoding of one code to improve the decoding of the second code. When parallel encoders are used, as in turbo coding, two corresponding decoders may conveniently be used in parallel for this purpose. Such iterative decoding is carried out for a plurality of iterations until it is believed that the soft data closely represents the transmitted data. Those bits that have a probability indicating that they are closer to one binary are assigned binary zero, and the remaining bits are assigned binary one.

Turbo coding represents an important advancement in the area of forward error correction (FEC). There are many variants of turbo coding, but most types of turbo coding use multiple encoding steps separated by interleaving steps combined with the use of iterative decoding. This combination provides previously unavailable performance with respect to noise tolerance in a communications system. Namely, turbo coding allows communications at levels of energy-per-bit per noise power spectral density (Eb/No) that were previously unacceptable using the existing forward error correction techniques.

Many communications systems use forward error correction techniques and therefore would benefit from the use of turbo coding. For example, turbo codes could improve the performance of wireless satellite links, in which the limited downlink transmit power of the satellite necessitates receiver systems that can operate at low Eb/No levels.

In some exemplary CDMA systems, such as HDR systems, the data may be transmitted in packets. Packets carrying data traffic may be transmitted in sub-packets. Due to interference in data transmission, the remote station may not successfully decode the encoded data that is transmitted in the first sub-packet. Therefore, data sub-packets are redundantly transmitted until the mobile decodes the data packet. Redundant sub-packets are then soft-combined at the receiver. Redundancy refers to the substantially similar information carried by each sub-packet. Redundant representations may be generated either through repetition or through additional coding. The process of soft combining allows the recovery of corrupted bits. Through the process of soft combining, wherein one corrupted sub-packet is combined with another corrupted sub-packet, the transmission of repetitious and redundant sub-packets can allow a system to transmit data at a guaranteed minimum transmission rate.

Transmissions of the sub-packets to the remote station may be in a staggered pattern so that transmission gaps occur between the redundant sub-packets. The delay between sub-packets provides an opportunity for the target remote station to process decoding the sub-packet before the arrival of the next sub-packet of the same packet. If the remote station is able to successfully decode the sub-packet before the arrival of the next sub-packet and to verify the CRC bits of the decoded result before the arrival of the next sub-packet, the remote station transmits an acknowledgment (ACK) signal to the base station. Otherwise, the remote station transmits a negative acknowledgment (NAK) signal to the base station. If the base station could demodulate and interpret the ACK signal sufficiently in advance of the next scheduled redundant sub-packet transmission, the base station need not send any redundant sub-packet. The base station may then transmit a new data packet to the same remote station or to another remote station during the slot period that had been designated for the cancelled redundant sub-packets.

Base stations may misinterpret ACK signals, which are transmitted by the remote stations, as NAK signal. Therefore, base stations may keep sending redundant sub-packets of the same packet even though the packet has been already received and successfully decoded. This results in a waste of air-interface resources. On the other hand, base stations may send new sub-packets for new packets on the same automatic repeat request (ARQ) channel ID, but remote stations may erroneously interpret them as belonging to previous packets, and thus, may not attempt to decode them. Therefore, remote stations may miss such new data packets.

There is, therefore, a need in the art for providing for enhanced data throughput by preventing unnecessary transmission of sub-packets while not missing new data packets.

SUMMARY

Embodiments disclosed herein address the above-stated needs by providing a method and system for preventing unnecessary sub-packet transmission while not missing new data packets. In one aspect, a method and system for receiving data packets on an automatic repeat request (ARQ) channel is provided. The method includes the steps of receiving a current sub-packet, having a current code, and sending an acknowledgement signal if a current packet corresponding to the current sub-packet has been successfully decoded and the current code is equivalent to a code for the previous sub-packet.

In another aspect, the method includes the steps of receiving a current sub-packet, having a current code, and sending an acknowledgement signal if a predetermined limit for sub-packet transmissions for the current packet has reached, and the current code is equivalent to a code for the previous sub-packet.

In another aspect, the method includes the steps of receiving a current sub-packet, having a current code, and sending an acknowledgement signal if the current code is not equivalent to a code for a previous sub-packet, but the current packet corresponding to the current sub-packet may be completely decoded from the current sub-packet.

In another aspect, the method includes the steps of receiving a current sub-packet, having a current code, and sending a negative acknowledgement signal if the current code is not equivalent to a code for a previous sub-packet and a predetermined limit for sub-packet transmissions for the current packet has reached.

In another aspect, the method includes the steps of receiving a current sub-packet, having a current code and sending a negative acknowledgement signal if the current packet corresponding to the current sub-packet may not be completely decoded from the current sub-packet and a predetermined limit for sub-packet transmissions for the current packet has reached.

Still in another aspect, a method and system for sending data packets on an ARQ channel is provided. The method includes the steps of sending a first sub-packet, having a first code, and sending a second sub-packet, having a second code, such that the first code is equivalent to the second code if they are for same packet.

DETAILED DESCRIPTION

Figure 1:
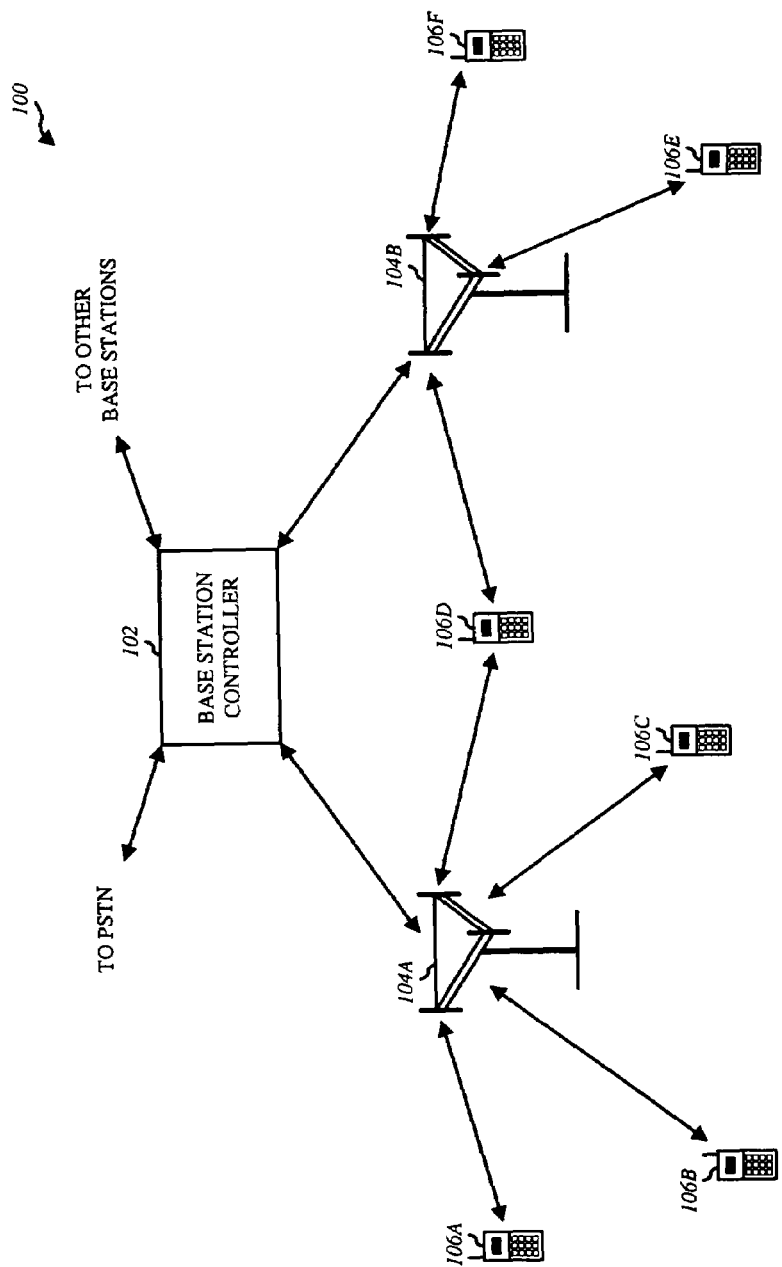
FIG. 1 is a block diagram of an exemplary voice and data communication system.

FIG. 1 is a diagram of a wireless communication system 100 that supports a number of users and is capable of implementing various aspects of the invention. System 100 provides communication for a number of cells, with each cell being serviced by corresponding base stations 104A and 104B. The base stations are also commonly referred to as base transceiver systems (BTSs). Various remote stations 106 are dispersed throughout the system. Each remote station 106 may communicate with one or more base stations 104 on the forward and reverse links at any particular moment, depending on whether or not the remote station is active and whether or not it is in soft handoff. The forward link refers to transmission from base station 104 to remote station 106, and the reverse link refers to transmission from remote station 106 to base station 104. As shown in FIG. 1, base station 104A communicates with remote stations 106A, 106B, 106C, and 106D, and base station 104B communicates with remote stations 106D, 106E, and 106F. Remote station 106D is in soft handoff and concurrently communicates with base stations 104A and 104B.

In system 100, a base station controller (BSC) 102 couples to base stations 104 and may further couple to a public switched telephone network (PSTN). The coupling to the PSTN may be achieved via a mobile switching center (MSC), which is not shown in FIG. 1 for simplicity. A BSC may also couple into a packet network, which is typically achieved via a packet data serving node (PDSN) that is also not shown in FIG. 1. BSC 102 provides coordination and control for the base stations coupled to it. BSC 102 further controls the routing of telephone calls among remote stations 106, and between remote stations 106 and users coupled to the PSTN (e.g., conventional telephones) and to the packet network, via base stations 104.

System 100 may be designed to support one or more CDMA wireless standards. Such standards may include the CDMA standards such as (1) the "TIA/EIA-95-B Remote station-Base Station Compatibility Standard for Dual-Mode Wideband Spread Spectrum Cellular System" (the IS-95 standard); (2) the "TIA/EIA-98-D Recommended Minimum Standard for Dual-Mode Wideband Spread Spectrum Cellular Remote station" (the IS-98 standard); (3) the documents offered by a consortium named "3rd Generation Partnership Project" (3GPP) and embodied in a set of documents including Document Nos. 3G TS 25.211, 3G TS 25.212, 3G TS 25.213, and 3G TS 25.214 (the W-CDMA standard); and (4) the documents offered by a consortium named "3rd Generation Partnership Project 2" (3GPP2) and embodied in a set of documents including Document Nos. C.S0002-A, C.S0005-A, C.S0010-A, C.S0011-A, C.S0024, and C.S0026 (the cdma2000 standard). In the case of the 3GPP and 3GPP2 documents, these are converted by standards bodies worldwide (e.g., TIA, ETSI, ARIB, TTA, and CWTS) into regional standards and have been converted into international standards by the International Telecommunications Union (ITU). These standards are incorporated herein by reference.

Figure 2:
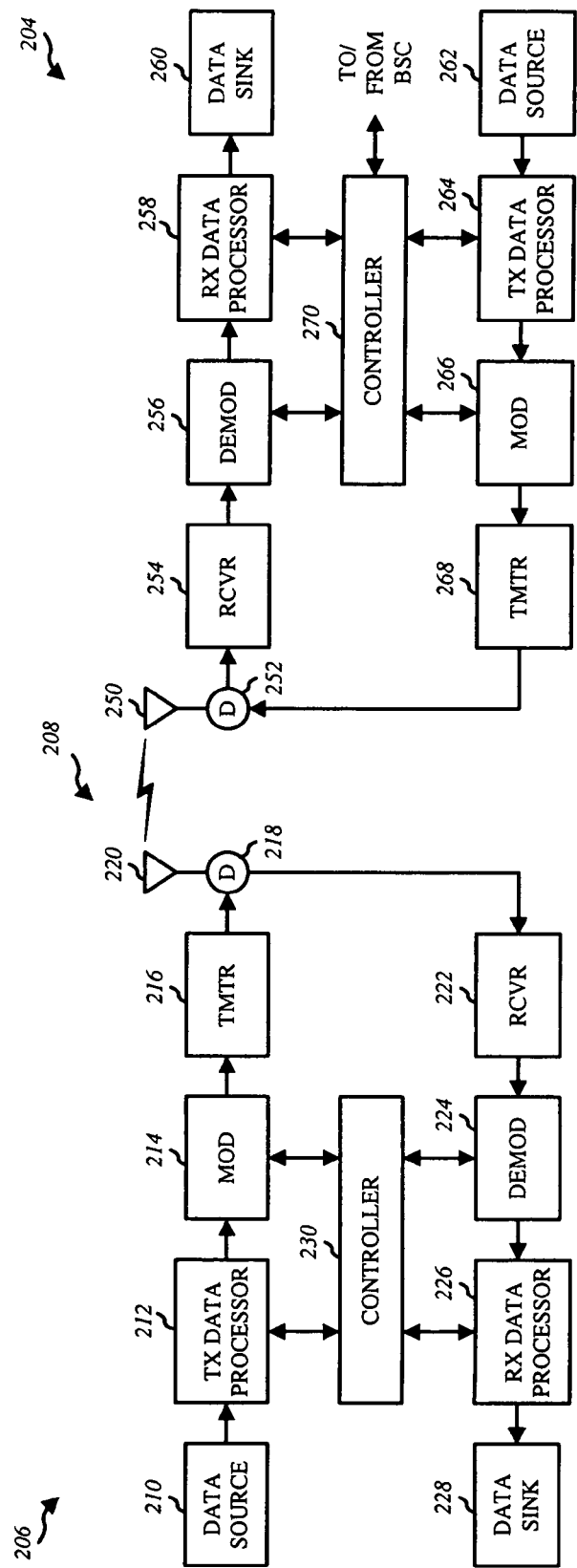
FIG. 2 is a block diagram of an exemplary embodiment for the remote station and the base station operating in FIG. 1.

FIG. 2 is a simplified block diagram of an embodiment of base station 204 and remote station 206, which are capable of implementing various aspects of the invention. For a particular communication, voice data, packet data, and/or messages may be exchanged between base station 204 and remote station 206, via an air interface 208. Various types of messages may be transmitted, such as messages used to establish a communication session between the base station and remote station and messages used to control a data transmission (e.g., power control, data rate information, acknowledgment, and so on). Some of these message types are described in further detail below. For the reverse link, at remote station 206, voice and/or packet data (e.g., from a data source 210) and messages (e.g., from a controller 230) are provided to a transmit (TX) data processor 212, which formats and encodes the data and messages with one or more coding schemes to generate coded data. Each coding scheme may include any combination of cyclic redundancy check (CRC), convolutional, turbo, block, and other coding, or no coding at all. The voice data, packet data, and messages may be coded using different schemes, and different types of messages may be coded differently.

The coded data is then provided to a modulator (MOD) 214 and further processed (e.g., covered, spread with short PN sequences, and scrambled with a long PN sequence assigned to the user terminal). The modulated data is then provided to a transmitter unit (TMTR) 216 and conditioned (e.g., converted to one or more analog signals, amplified, filtered, and quadrature modulated) to generate a reverse link signal. The reverse link signal is routed through a duplexer (D) 218 and transmitted via an antenna 220 to base station 204.

At base station 204, the reverse link signal is received by an antenna 250, routed through a duplexer 252, and provided to a receiver unit (RCVR) 254. Receiver unit 254 conditions (e.g., filters, amplifies, down converts, and digitizes) the received signal and provides samples. A demodulator (DEMOD) 256 receives and processes (e.g., despreads, decovers, and pilot demodulates) the samples to provide recovered symbols. Demodulator 256 may implement a rake receiver that processes multiple instances of the received signal and generates combined symbols. A receive (RX) data processor 258 then decodes the symbols to recover the data and messages transmitted on the reverse link. The recovered voice/packet data is provided to a data sink 260 and the recovered messages may be provided to a controller 270. The processing by demodulator 256 and RX data processor 258 are complementary to that performed at remote station 206. Demodulator 256 and RX data processor 258 may further be operated to process multiple transmissions received via multiple channels, e.g., a reverse fundamental channel (R-FCH) and a reverse supplemental channel (R-SCH). Also, transmissions may be simultaneously from multiple remote stations, each of which may be transmitting on a reverse fundamental channel, a reverse supplemental channel, or both.

On the forward link, at base station 204, voice and/or packet data (e.g., from a data source 262) and messages (e.g., from controller 270) are processed (e.g., formatted and encoded) by a transmit (TX) data processor 264, further processed (e.g., covered and spread) by a modulator (MOD) 266, and conditioned (e.g., converted to analog signals, amplified, filtered, and quadrature modulated) by a transmitter unit (TMTR) 268 to generate a forward link signal. The forward link signal is routed through duplexer 252 and transmitted via antenna 250 to remote station 206.

At remote station 206, the forward link signal is received by antenna 220, routed through duplexer 218, and provided to a receiver unit 222. Receiver unit 222 conditions (e.g., down converts, filters, amplifies, quadrature modulates, and digitizes) the received signal and provides samples. The samples are processed (e.g., despreaded, decovered, and pilot demodulated) by a demodulator 224 to provide symbols, and the symbols are further processed (e.g., decoded and checked) by a receive data processor 226 to recover the data and messages transmitted on the forward link. The recovered data is provided to a data sink 228, and the recovered messages may be provided to controller 230.

In some exemplary CDMA systems, packets carrying data traffic are divided into sub-packets, which occupy "slots" of a transmission channel. For illustrative ease only, the nomenclature of a High Data Rate (HDR) system is used herein. Such use is not intended to limit the implementation of the invention to HDR systems. Embodiments can be implemented in other CDMA systems, such as, e.g. cdma2000, without affecting the scope of the embodiments described herein.

In an HDR system, slot sizes have been designated as 1.66 ms, but it should be understood that slot sizes might vary in the embodiments described herein without affecting the scope of the embodiments. For example, the slot size in cdma2000 systems is 1.25 ms in duration. In addition, data traffic can be transmitted in message frames, which can be 5 ms, 10 ms, 20 ms, 40 ms or 80 ms in duration in IS-95 systems. The terms "slots" and "frames" are terms used with respect to different data channels within the same or between different CDMA systems. A CDMA system comprises a multitude of channels on the forward and reverse links, wherein some channels are structured differently from others. Hence, the terminology to describe some channels will differ in accordance with the channels. For illustrative purposes only, the term "slots" will be used hereafter to describe the packaging of signals propagated over the air.

Redundant representations of the data payload, or sub-packets, may be packed into time frames or slots, or sub-packets, which may then be soft-combined at the receiver. Redundant representations may be generated either through repetition or through additional coding. The process of soft combining allows the recovery of corrupted bits. Through the process of soft combining, wherein one corrupted sub-packet is combined with another corrupted sub-packet, the transmission of repetitious and redundant sub-packets can allow a system to transmit data at a minimum transmission rate. The transmission of repetitious and redundant sub-packets is especially desirable in the presence of fading.

Rayleigh fading, which is a form of multipath interference, occurs when multiple copies of the same signal arrive at the receiver at different phases, potentially causing destructive interference. Substantial multipath interference with very small delay spread can occur to produce flat fading over the entire signal bandwidth. If the remote station is traveling in a rapidly changing environment, deep fades could occur at times when sub-packets are scheduled for retransmission. When such a circumstance occurs, the base station requires additional transmission power to transmit the sub-packet.

For example, if a scheduler unit within a base station receives a data packet for transmission to a remote station, the data payload is redundantly packed into a plurality of sub-packets, which are sequentially transmitted to a remote station. When transmitting the sub-packets, the scheduler unit may decide to transmit the sub-packets either periodically or in a channel-sensitive manner.

The forward link from the base station to a remote station operating within the range of the base station can comprise a plurality of channels. Some of the channels of the forward link can include, but are not limited to a pilot channel, synchronization channel, paging channel, quick paging channel, broadcast channel, power control channel, assignment channel, control channel, dedicated control channel, medium access control (MAC) channel, fundamental channel, supplemental channel, supplemental code channel, and packet data channel. The reverse link from a remote station to a base station also comprises a plurality of channels. Each channel carries different types of information to the target destination. Typically, voice traffic is carried on fundamental channels, and data traffic is carried on supplemental channels or packet data channels. Supplemental channels are usually dedicated channels, while packet data channels usually carry signals that are designated for different parties in a time-multiplexed manner. Alternatively, packet data channels are also described as shared supplemental channels. For the purposes of describing the embodiments herein, the supplemental channels and the packet data channels are generically referred to as data traffic channels.

Supplemental channels and packet data channels can improve the average transmission rate of the system by allowing the transmission of unexpected data messages to a target station. Since the data payload can be redundantly packed on these channels, a multi-slot transmission scheduled on the forward link may be terminated early if the remote station can determine that the data payload is recoverable from the sub-packets that have already been received. As described above, the data payload that is carried in each slot may undergo various encoding steps wherein the encoded bits are re-ordered into a channel-tolerant format. Hence, in order to accomplish data recovery, the decoder of the remote station must decode the contents of each slot of the multi-slot transmission.

In an HDR system, the rates at which the sub-packets are to be transmitted from a base station to a remote station are determined by a rate control algorithm performed by the remote station and a scheduling algorithm at the base station. This method to modify the data transmission rate is referred to as an automatic repeat request (ARQ) procedure. It should be noted that the system throughput is determined by the rate at which data payload is actually received, which may differ from the bit rate of the transmitted sub-packets. It should also be noted that the invention is not limited to the above implementation. For example, both a rate control algorithm and a scheduling algorithm may be performed at a base station with a channel state feedback from remote stations, without affecting the scope of the embodiments described herein.

The rate control algorithm is implemented by the remote station in order to determine which base station in the active set can provide the best throughput and to determine the maximum data rate at which the remote station can receive packets with sufficient reliability. The active set is the set of base stations that are currently in communication with the remote station. In a typical CDMA or non-CDMA wireless system, a base station transmits a known signal, referred to as a "pilot," at well-defined, periodic intervals. The remote station typically monitors the pilot signal of each base station maintained in the active set, and determines the signal-to-noise-and-interference-ratio (SNIR) of each pilot signal. Based on past SNIR information, the remote station predicts a future value of the SNIR for each base station, wherein the future value of the SNIR will be associated with the next packet duration. The remote station then picks the base station that is likely to have the most favorable SNIR over a period of the near future, and estimates the best data rate at which the remote station can receive the next data packet from this base station. The remote station then transmits a data rate control message (DRC) carrying this data rate information to the base station. The best data rate information carried by the DRC may be the data rate at which the remote station requests the next data packet to be transmitted. In an HDR system, the DRC messages are transmitted on a medium access control (MAC) channel of the reverse link waveform.

The scheduling algorithm is implemented at the base station to determine which remote station will be the recipient of the next packet. The scheduling algorithm takes into account the need to maximize base station throughput, the need to maintain fairness between all remote stations operating within the range of the base station, and the need to accommodate the data transmission rates requested by various remote stations. As discussed below, the fast ARQ procedure determines the actual data transmission rate at which each data packet is received, as opposed to the data transmission rate initially determined by the rate control algorithm.

A scheduling unit in the base station monitors the arrival of DRCs from all remote stations that are operating within its range, and uses the DRC information in the scheduling algorithm to determine which remote station will be the next data packet recipient, in accordance with an optimal forward link throughput level. It should be noted that an optimal forward link throughput takes into consideration the maintenance of acceptable link performances for all remote stations operating within the range of the base station. The scheduling unit reassembles the data packet into sub-packets with the appropriate bit rate, and generates a transmission schedule for the sub-packets on designated slots.

As the sub-packets are transmitted, the remote station may determine that the data packet can be successfully decoded from fewer than all the sub-packets scheduled for transmission. Using the fast ARQ procedure, the remote station instructs the base station to stop the transmission of redundant sub-packets, thereby increasing the effective data transmission rate of the system.

It should be noted that the ARQ procedure has the potential to significantly increase the forward link throughput of the underlying wireless communication system. As discussed above, when the remote station transmits a DRC message to the base station, the requested data transmission rate is determined using the rate control algorithm, which uses past SNIR values to predict the SNIR value of the near future. However, due to fading conditions that arises due to environmental factors and the mobility of the remote station, the prediction of the SNIR for the near future is not reliable. In addition, the SNIR of the forward link traffic signal may be very different from the SNIR of the pilot signal due to interference from adjacent base stations. It is possible that some of the neighboring base stations may have been idle during the sampling period for the SNIR prediction calculations. As a result, the remote station may not always predict the SNIR with great accuracy. Therefore, the rate control algorithm provides a lower bound estimate for the actual SNIR during the next packet duration with high probability, and determines the maximum data transmission rate that can be sustained if the actual SNIR is equal to this lower bound estimate. In other words, the rate control algorithm provides a conservative measure of the data transmission rate at which the next packet can be received. The ARQ procedure refines this estimate, based on the quality of the data received during the initial stages of the packet transmission. Hence, it is important for the remote station to inform the base station as soon as the remote station has enough information to decode a data packet, so that early termination of redundant transmissions can occur, which enhances the data transmission rate of the data packet.

Transmissions of the sub-packets to the remote station may be in a staggered pattern so that transmission gaps occur between the sub-packets. In one embodiment, the sub-packets are transmitted periodically at every 4th slot. The delay between sub-packets provides an opportunity for the target remote station to decode the sub-packet before the arrival of the next sub-packet of the same packet. If the remote station is able to decode the sub-packet and to verify the CRC bits of the decoded result before the arrival of the next sub-packet, the remote station may transmit an acknowledgment signal, hereinafter referred to as a FAST_ACK signal, to the base station. If the base station can demodulate and interpret the FAST_ACK signal sufficiently in advance of the next scheduled sub-packet transmission, the base station need not send the scheduled sub-packet transmissions. The base station may then transmit a new data packet to the same remote station or to another remote station during the slot period that had been designated for the cancelled sub-packets. It should be noted that the FAST_ACK signal herein described is separate and distinct from the ACK messages that are exchanged between the higher layer protocols, such as the Radio Link Protocol (RLP) and the Transmission Control Protocol (TCP).

Since the ARQ procedure allows a fast rate adaptation to channel conditions, the ARQ procedure allows for the implementation of a system wherein the initial data transmission may be performed at a high data rate and ramped down as needed. In contrast, a system without ARQ would be forced to operate at a lower data rate, in order to provide a sufficient link budget margin to account for channel variations during packet transmissions.

In one embodiment, base stations may represent a sub-packet by a pair of indices. For example, "Aij" represents the "jth" sub-packet of the packet "i" that is transmitted to a user "A." The packet "i" may belong to the ARQ channel, which is labeled with the ARQ channel ID (ACID) "i." The sub-packet representation "Aij" may be reused for new packets after the current packet assigned thereto is successfully received and decoded.

In one embodiment, the sub-packets are transmitted sequentially following the order of ARQ channel IDs, e.g., 0, 1, 2, . . . , N, where the number of ACIDs, e.g., N+1, is known to both the base station and the remote station. In one embodiment, the role of base station and mobile station can be reversed. That is, the sender of the data may be the mobile station and the receiver may be the base station.

Base stations may transmit the data packets in a predetermined sequence. However, the packets that are received and successfully decoded at a target remote station may not be in the same sequence. This is because some earlier transmitted packets may be correctly received after some later transmitted ones, as will be described herein. Therefore, the target remote station has to re-sequence the decoded packets before sending them to higher layers, without unnecessarily holding up the data at the remote station.

Figure 3:
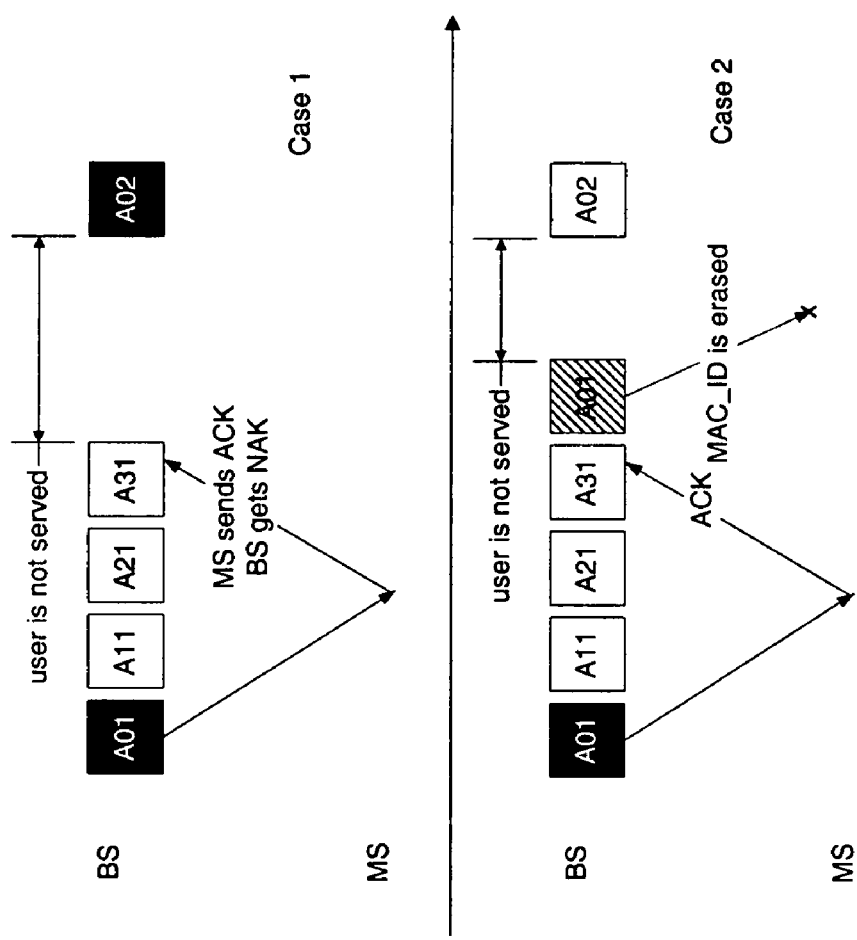
FIG. 3 shows exemplary sets of sub-packets transmitted by the base station.

FIG. 3 shows two exemplary sets of sub-packets that the base station may send to a mobile station. In case 1, the mobile station has received and successfully decoded sub-packet A01, which was transmitted on ACID of 0. Consequently the mobile station sent an ACK signal. However, the base station misinterpreted the ACK signal as an NAK signal. Therefore, the base station has sent another sub-packet of the same packet that has been already decoded, which was also transmitted on ACID of 0. This results in waste of air-interface resources.

In case 2, the mobile station received and successfully decoded sub-packet A01, which had been also transmitted on ACID of 0. Consequently the mobile station sent an ACK signal. Therefore, the base station sent a new sub-packet, A01, for a new packet, which was also transmitted on ACID of 0. It should be noted that the second A01 was sent on ACID of 0 because ACIDs 1, 2, and 3 had been used while the base station was waiting to receive the ACK or NAK from the mobile station. However, since the latter sub-packet never reached the remote station, due to some error, e.g., accidental erasure of MAC-ID, the base station considered a NAK had been received by default and transmitted another sub-packet, A02, of the same packet, which is also transmitted on ACID of 0. The remote station may erroneously consider sub-packet A02 as belonging to the previously decoded packet and thus not decode it. Therefore, the remote station will miss the new data packet.

The Hybrid ARQ (HARQ) sublayer at the remote station cannot distinguish between the two cases discussed above. If the remote station assumes that Case 2 has occurred, when Case 1 has occurred in reality, then the remote station attempts to decode the A02 sub-packet by itself. If the MS could not decode A02 sub-packet successfully, then it will send an NAK signal, and the base station will continue sending more sub-packet corresponding to a packet that the MS has already successfully decoded. This results in a waste of air-interface resources and can also cause the HARQ sub-layer to hold off, i.e., not deliver to the upper layers, the correctly decoded data packets that have been received on the subsequent ACIDs until the packet corresponding to the ACID of 0 is either decoded successfully, which may cause packets to be delivered to the upper layer in the wrong order, or until the packet corresponding to the ACID of 0 has gone through its max number of sub-packet transmissions. On the other hand, if the remote station assumes that case 1 has occurred, but case 2 had occurred in reality, the remote stations attempts to send an ACK signal and not to decode the A02 packet. This results in missing the new packet.

In one embodiment, base stations may distinguish between a redundant sub-packet of a current data packet and a new sub-packet of a new data packet such that the remote stations may distinguish between the two cases shown in FIG. 3.

Figure 4:
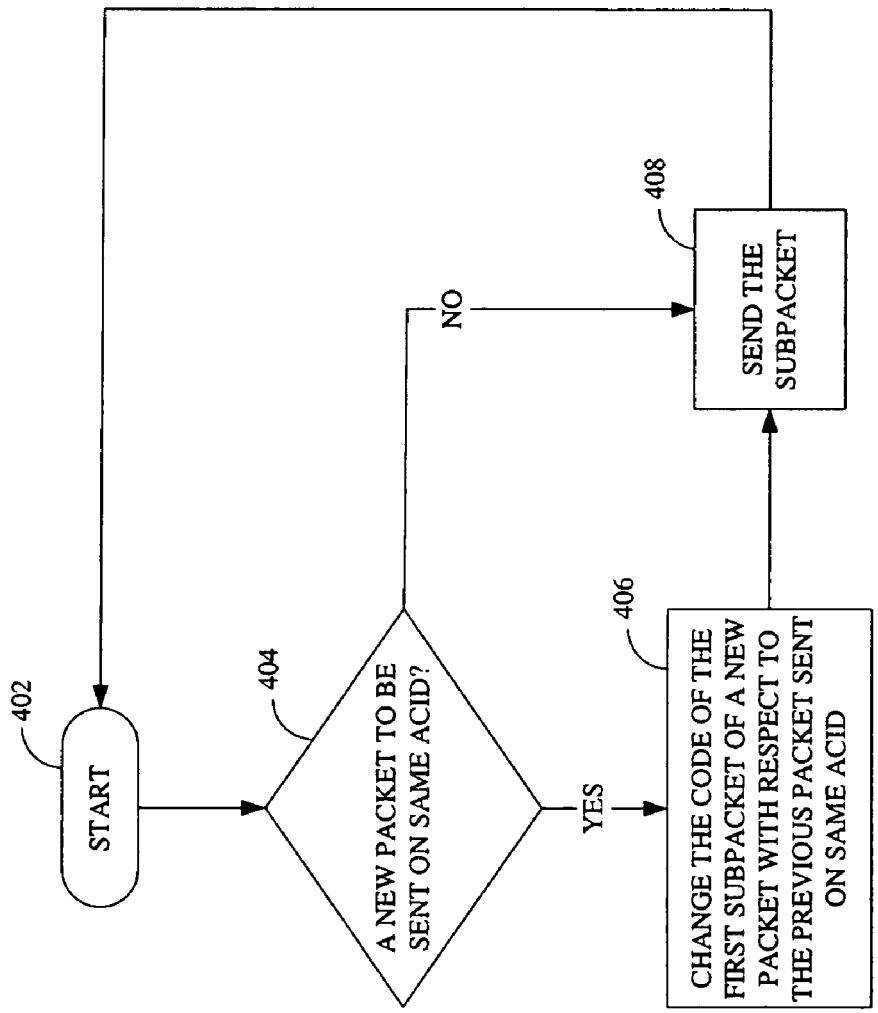
FIG. 4 is a flow chart for assigning color to data sub-packets transmitted by the base station.

FIG. 4 shows an exemplary process for distinguishing between a redundant sub-packet of a current data packet and new sub-packet of a new data packet by assigning different codes, e.g., binary codes, to the two sub-packets. When the base station is going to send a new sub-packet of a new packet on the same ACID, as determined in step 404, the base station sends the new sub-packet with a different code with respect to the code of the sub-packets of the previous packet, in step 406. Otherwise, the base station sends 408, the new sub-packet with the same code, indicating that the sub-packet is for the same packet. Consequently, the remote station can distinguish a new packet from a previous packet.

Figure 5:
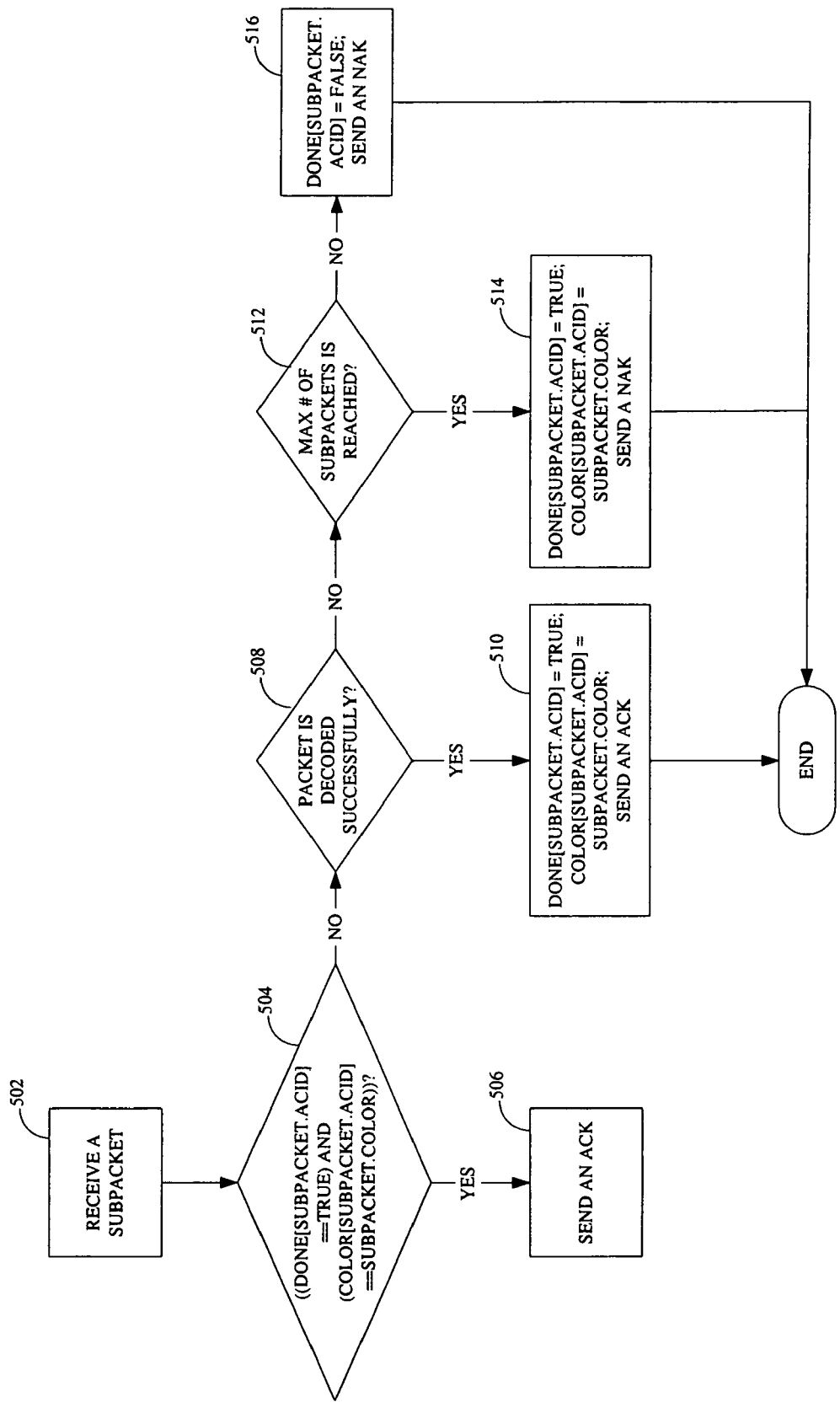
FIG. 5 is a flow chart of an exemplary process for receiving data sub-packets.

FIG. 5 shows an exemplary process for distinguishing between a sub-packet of a current data packet and a new sub-packet of a new data packet. When the remote station receives 502 a sub-packet, it makes 504 two determinations. The first is whether the current sub-packet has the same code as the most recent sub-packet on the same ACID. The second determination is whether the packet corresponding to the current sub-packet has been received and successfully decoded, or whether a predetermined limit for transmission of the current sub-packet has been reached.

If the result of the two determinations is positive, which corresponds to case 1 in FIG. 3, the remote station sends 506 an ACK signal to the base station. Otherwise, if the code of the received sub-packet has changed, indicating that the received sub-packet is for a new data packet, which corresponds to case 2 in FIG. 3, the base station determines 508 whether it can successfully decode the new data packet from the received sub-packet. If yes, the remote station sends 510 an ACK signal, indicating that it has successfully decoded the new data packet. The remote station then stores the current sub-packet's code as well as an indication that it has successfully decoded the data packet from the current sub-packet.

If the remote station could not successfully decode the data packet from the current sub-packet, the remote station determines 512 whether a predetermined limit for transmission of the current sub-packet has reached. If yes, the remote station sends 514 an NAK signal. The remote station then stores the current-sub-packet's code as well as an indication that the predetermined limit for transmission of the current sub-packet has reached.

If the remote station determines that it has not successfully decoded the packet for the current sub-packet and the predetermined maximum number for transmission of the current sub-packet has not been reached, the remote station sends 516 an NAK signal, asking for more sub-packets for the same packet.

For example, the base station sends a new sub-packet A21 with code of 0 on ACID of 2. However, the remote station either does not receive A21 or cannot successfully decode the corresponding packet. Therefore, the remote station sends an NAK signal, and the base station sends sub-packet A22 with the same code of 0 on the same ACID of 2. However, the remote station fails again to either receive A22 or successfully decode the corresponding packet. Therefore, the remote station sends another NAK signal, and the base station sends sub-packet A23 with the same code of 0 on the same ACID of 2, which is eventually received and successfully decoded.

It should be noticed that after the remote station has received and successfully decoded the first sub-packet A01, and has sent an ACK signal to the base station, the base station sends the second sub-packet A01 as the first sub-packet of a new packet on the same ACID, but with a different code.

The word "exemplary" is used exclusively herein to mean "serving as an example, instance, or illustration." Any embodiment described herein as "exemplary" is not necessarily to be construed as preferred or advantageous over other embodiments.

An HDR subscriber station, referred to herein as an access terminal (AT), may be mobile or stationary, and may communicate with one or more HDR base stations, referred to herein as modem pool transceivers (MPTs). An access terminal transmits and receives data packets through one or more modem pool transceivers to an HDR base station controller, referred to herein as a modem pool controller (MPC). Modem pool transceivers and modem pool controllers are parts of a network called an access network. An access network transports data packets between multiple access terminals. The access network may be further connected to additional networks outside the access network, such as a corporate intranet or the Internet, and may transport data packets between each access terminal and such outside networks. An access terminal that has established an active traffic channel connection with one or more modem pool transceivers is called an active access terminal, and is said to be in a traffic state. An access terminal that is in the process of establishing an active traffic channel connection with one or more modem pool transceivers is said to be in a connection setup state. An access terminal may be any data device that communicates through a wireless channel or through a wired channel, for example using fiber optic or coaxial cables. An access terminal may further be any of a number of types of devices including, but not limited to, PC card, compact flash, external or internal modem, or wireless or wireline phone. The communication link through which the access terminal sends signals to the modem pool transceiver is called a reverse link. The communication link through which a modem pool transceiver sends signals to an access terminal is called a forward link.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with an DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, register, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of receiving data packets on an automatic repeat request (ARQ) channel, the method comprising:
    receiving at a remote station a current sub-packet, the current sub-packet having a current code;
    determining that the current sub-packet is for a new packet if an ARQ Channel ID (ACID) of a previous sub-packet and an ACID of the current sub-packet are equivalent and the current code is not equivalent to a previous code of the previous sub-packet; and
    sending an acknowledgement signal if a current packet corresponding to the current sub-packet was successfully decoded,
    wherein the current code is configured to be equivalent to the previous code if the current sub-packet and the previous sub-packet contain redundant representations of a payload for the current packet.

2. The method of claim 1 further including storing the current code.

3. The method of claim 1 further including:
    storing an indication that the current data packet corresponding to the current sub-packet has been completely decoded.

4. A method of receiving data packets on an automatic repeat request (ARQ) channel, the method comprising:
    receiving at a remote station a current sub-packet, the current sub-packet having a current code;
    determining that the current sub-packet is for a new packet if an ARQ Channel ID (ACID) of a previous sub-packet and an ACID of the current sub-packet are equivalent and the current code is not equivalent to a previous code of the previous sub-packet; and
    sending a negative acknowledgement signal if a predetermined limit for sub-packet transmissions for the current data packet has been reached,
    wherein the current code is equivalent to the previous code for the previous sub-packet, and
    wherein the current code is configured to be equivalent to the previous code if the current sub-packet and the previous sub-packet contain redundant representations of a payload for the current data packet.

5. A method of receiving data packets on an automatic repeat request (ARQ) channel, the method comprising:
    receiving at a remote station a current sub-packet, the current sub-packet having a current code;
    determining that the current sub-packet is for a new packet if an ARQ Channel ID (ACID) of a previous sub-packet and an ACID of the current sub-packet are equivalent and the current code is not equivalent to a previous code of the previous sub-packet; and
    sending a negative acknowledgement signal if:
        the current code is not equivalent to a code for a previous sub-packet; and
        a predetermined limit for sub-packet transmissions for the current data packet has been reached.

6. The method of claim 5 further including storing the current code.

7. The method of claim 5 further including:
    storing an indication that the predetermined limit for sub-packet transmission for the current data packet has been reached.

8. A method of receiving data packets on an automatic repeat request (ARQ) channel, the method comprising:
    receiving at a remote station a current sub-packet, the current sub-packet having a current code;
    determining that the current sub-packet is for a new packet if an ARQ Channel ID (ACID) of a previous sub-packet and an ACID of the current sub-packet are equivalent and the current code is not equivalent to a previous code of the previous sub-packet; and
    sending a negative acknowledgement signal if:
        a current data packet corresponding to the current sub-packet may not be completely decoded from the current sub-packet; and
        a predetermined limit for sub-packet transmissions for the current data packet has been reached.

9. The method of claim 8 further including:
    storing an indication that the current data packet corresponding to the current sub-packet has not been decoded; and
    storing an indication that the predetermined limit for sub-packet transmission for the current data packet has been reached.

10. A method for sending data packets on an automatic repeat request (ARQ) channel, the method comprising:
    sending at a base station a first code with a first sub-packet, the first code indicative of the first sub-packet being a first transmission of a new data packet if an ARQ Channel ID (ACID) of a previous sub-packet and an ACID of the first sub-packet are equivalent and the first code is not equivalent to a previous code of the previous sub-packet;

when the new data packet has been properly decoded, determining that a second code for a second sub-packet is unique from the first code; and sending the second code with the second sub-packet.

11. The method of claim 10, wherein the first code and the second code are binary codes.

12. A non-transitory computer-readable medium encoded with executable instructions for receiving data packets on an automatic repeat request (ARQ) channel, the instructions which executed by the computer to:

receive a current sub-packet, the current sub-packet having a current code;

determine the current sub-packet is for a new packet if an ARQ Channel ID (ACID) of a previous sub-packet and an ACID of the current sub-packet are equivalent and the current code is not equivalent to a previous code of the previous sub-packet; and send an acknowledgement signal if a current packet corresponding to the current sub-packet was successfully decoded, wherein the current code is configured to be equivalent to the previous code if the current sub-packet and the previous sub-packet contain redundant representations of a payload for the current packet.

13. An apparatus for receiving data packets on an automatic repeat request (ARQ) channel, comprising:

means for receiving a current sub-packet, the current sub-packet having a current code;

means for determining the current sub-packet is for a new packet if an ARQ Channel ID (ACID) of a previous sub-packet and an ACID of the current sub-packet are equivalent and the current code is not equivalent to a previous code of the previous sub-packet, and means for sending an acknowledgement signal if a current packet corresponding to the current sub-packet was successfully decoded, wherein the current code is configured to be equivalent to the previous code if the current sub-packet and the previous sub-packet contain redundant representations of a payload for the current packet.

14. An apparatus for receiving data packets, comprising:

a memory unit; and a digital signal-processing (DSP) unit communicatively coupled to the memory unit, the DSP unit configured to:

receive a current sub-packet, the current sub-packet having a current code;

determine the current sub-packet is for a new packet if an ARQ Channel ID (ACID) of a previous sub-packet and an ACID of the current sub-packet are equivalent and the current code is not equivalent to a previous code of the previous sub-packet; and send an acknowledgement signal if a current packet corresponding to the current sub-packet was successfully decoded, wherein the current code is configured to be equivalent to the previous code if the current sub-packet and the previous sub-packet contain redundant representations of a payload for the current packet.

15. A non-transitory computer-readable medium encoded with computer-executable instructions thereon for sending data packets on an automatic repeat request (ARQ) channel, the instructions which executed by the computer to:

send a first code with a first sub-packet, the first code indicative of the first sub-packet being a first transmission of a new data packet if an ARQ Channel ID (ACID) of a previous sub-packet and an ACID of the first sub-packet are equivalent and the first code is not equivalent to a previous code of the previous sub-packet;

when the new data packet has been properly decoded, determine that a second code for a second sub-packet is unique from the first code; and send the second code with the second sub-packet.

16. An apparatus for sending data packets on an automatic repeat request (ARQ) channel, comprising:

means for sending a first code with a first sub-packet, the first code indicative of the first sub-packet being a first transmission of a new data packet if an ARQ Channel ID (ACID) of a previous sub-packet and an ACID of the first sub-packet are equivalent and the first code is not equivalent to a previous code of the previous sub-packet;

when the new data packet has been properly decoded, means for determining that a second code for a second sub-packet is unique from the first code; and means for sending the second code with the second sub-packet.

17. An apparatus for sending data packets, comprising:

a memory unit; and a digital signal-processing (DSP) unit communicatively coupled to the memory unit, the DSP unit configured to:

send a first code with a first sub-packet, the first code indicative of the first sub-packet being a first transmission of a new data packet if an ARQ Channel ID (ACID) of a previous sub-packet and an ACID of the first sub-packet are equivalent and the first code is not equivalent to a previous code of the previous sub-packet;

when the new data packet has been properly decoded, determine that a second code for a second sub-packet is unique from the first code; and send the second code with the second sub-packet.

18. An apparatus for receiving data packets on an automatic repeat request (ARQ) channel, comprising:

a memory unit; and a digital signal-processing (DSP) unit communicatively coupled to the memory unit, the DSP unit configured to:

receive a current sub-packet, the current sub-packet having a current code;

determine that the current sub-packet is for a new packet if an ARQ Channel ID (ACID) of a previous sub-packet and an ACID of the current sub-packet are equivalent and the current code is not equivalent to a previous code of the previous sub-packet; and send a negative acknowledgement signal if a predetermined limit for sub-packet transmissions for the current data packet has been reached, wherein the current code is equivalent to the previous code for the previous sub-packet, and wherein the current code is configured to be equivalent to the previous code if the current sub-packet and the previous sub-packet contain redundant representations, of a payload for the current data packet.

19. An apparatus for receiving data packets on an automatic repeat request (ARQ) channel, the apparatus comprising:

means for receiving at a remote station a current sub-packet, the current sub-packet having a current code;

means for determining that the current sub-packet is for a new packet if an ARQ Channel ID (ACID) of a previous sub-packet and an ACID of the current sub-packet are equivalent and the current code is not equivalent to a previous code of the previous sub-packet; and means for sending a negative acknowledgement signal if a predetermined limit for sub-packet transmissions for the current data packet has been reached, wherein the current code is equivalent to the previous code for the previous sub-packet, and wherein the current code is configured to be equivalent to the previous code if the current sub-packet and the previous sub-packet contain redundant representations of a payload for the current data packet.

20. A computer-readable medium encoded with executable instructions for receiving data packets on an automatic repeat request (ARQ) channel, the instructions causing the computer to:

receive a current sub-packet, the current sub-packet having a current code;

determine that the current sub-packet is for a new packet if an ARQ Channel ID (ACID) of a previous sub-packet and an ACID of the current sub-packet are equivalent and the current code is not equivalent to a previous code of the previous sub-packet; and send a negative acknowledgement signal if a predetermined limit for sub-packet transmissions for the current data packet has been reached, wherein the current code is equivalent to the previous code for the previous sub-packet, and wherein the current code is configured to be equivalent to the previous code if the current sub-packet and the previous sub-packet contain redundant representations of a payload for the current data packet.

21. An apparatus for receiving data packets for receiving data packets on an automatic repeat request (ARQ) channel, the apparatus comprising:

a memory unit; and a digital signal-processing (DSP) unit communicatively coupled to the memory unit, the DSP unit configured to:

receive a current sub-packet, the current sub-packet having a current code;

determine that the current sub-packet is for a new packet if an ARQ Channel ID (ACID) of a previous sub-packet and an ACID of the current sub-packet are equivalent and the current code is not equivalent to a previous code of the previous sub-packet; and send a negative acknowledgement signal if:
  the current code, is not equivalent to a code for a previous sub-packet; and
  a predetermined limit for sub-packet transmissions for the current data packet has been reached.

22. An apparatus for receiving data packets on an automatic repeat request (ARQ) channel, the apparatus comprising:

means for receiving a current sub-packet, the current sub-packet having a current code;

means for determining the current sub-packet is for a new packet if an ARQ Channel ID (ACID) of a previous sub-packet and an ACID of the current sub-packet are equivalent and the current code is not equivalent to a previous code of the previous sub-packet; and means for sending a negative acknowledgement signal if:
  the current code is not equivalent to a code for a previous sub-packet; and
  a predetermined limit for sub-packet transmissions for the current-data packet has been reached.

23. A non-transitory computer-readable medium encoded with executable instructions for receiving data packets on an automatic repeat request (ARQ) channel, the instructions causing the computer to:

receive a current sub-packet, the current sub-packet having a current-code;

determine that the current sub-packet is for a new packet if an ARQ Channel ID (ACID) of a previous sub-packet and an ACID of the current sub-packet are equivalent and the current code is not equivalent to a previous code of the previous sub-packet; and send a negative acknowledgement signal if:
  the current code is not equivalent to a code for a previous sub-packet; and
  a predetermined limit for sub-packet transmissions for the current data packet has been reached.

24. An apparatus for receiving data packets for receiving data packets on an automatic repeat request (ARQ) channel, the apparatus comprising:

a memory unit; and a digital signal-processing (DSP) unit communicatively coupled to the memory unit, the DSP unit configured to:

receive a current sub-packet, the current sub-packet having a current code;

determine that the current sub-packet is for a new packet if an ARQ Channel ID (ACID) of a previous sub-packet and an ACID of the current sub-packet are equivalent and the current code is not equivalent to a previous code of the previous sub-packet; and send a negative acknowledgement signal if:
  a current data packet corresponding to the current sub-packet may not be completely decoded from the current sub-packet; and
  a predetermined limit for sub-packet transmissions for the current data packet has been reached.

25. An apparatus for receiving data packets on an automatic repeat request (ARQ) channel, the apparatus comprising:

means for receiving at a remote station a current sub-packet, the current sub-packet having a current code;

means for determining that the current sub-packet is for a new packet if an ARQ Channel ID (ACID) of a previous sub-packet and an ACID of the current sub-packet are equivalent and the current code is not equivalent to a previous code of the previous sub-packet; and means for sending a negative acknowledgement signal if:
  a current data packet corresponding to the current sub-packet may not be completely decoded from the current sub-packet; and
  a predetermined limit for sub-packet transmissions for the current data packet has been reached.

26. A non-transitory computer-readable medium encoded with executable instructions for receiving data packets on an automatic repeat request (ARQ) channel, the instructions causing the computer to:

receive a current sub-packet, the current sub-packet having a current code;

determine that the current sub-packet is for a new packet if an ARQ Channel ID (ACID) of a previous sub-packet and an ACID of the current sub-packet are equivalent and the current code is not equivalent to a previous code of the previous sub-packet; and send a negative acknowledgement signal if:
  a current data packet corresponding to the current sub-packet may not be completely decoded from the current sub-packet; and
  a predetermined limit for sub-packet transmissions for the current data packet has been reached.

* * * * *